US011029948B1

(12) United States Patent
Patel et al.

(10) Patent No.: US 11,029,948 B1
(45) Date of Patent: Jun. 8, 2021

(54) SYSTEM FOR NORMALIZING DATA DEPENDENCY EFFECTS ACROSS AN ELECTRONIC NETWORK ENVIRONMENT

(71) Applicant: Bank of America Corporation, Charlotte, NC (US)

(72) Inventors: Dinesh Patel, Monroe, NJ (US); Giovanni Simeone, Westfield, NJ (US); Rituraj Deb Nath, New Canaan, CT (US); Mayer Crystal, Bergenfield, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 16/704,739

(22) Filed: Dec. 5, 2019

(51) Int. Cl.
    *G06F 8/73* (2018.01)
    *G06F 8/77* (2018.01)
    *G06F 8/71* (2018.01)
    *G06F 8/10* (2018.01)

(52) U.S. Cl.
    CPC .............. *G06F 8/73* (2013.01); *G06F 8/10* (2013.01); *G06F 8/71* (2013.01); *G06F 8/77* (2013.01); *G06F 2221/0737* (2013.01)

(58) Field of Classification Search
    CPC .............. G06F 8/10; G06F 8/20–316; G06F 2221/0737; G06F 11/3664–3696
    USPC ........................................ 717/101–109, 122
    See application file for complete search history.

(56) References Cited

U.S. PATENT DOCUMENTS

| 6,167,445 A  | 12/2000 | Gai et al. |
| 6,560,592 B1 | 5/2003  | Reid et al. |
| 6,587,466 B1 | 7/2003  | Bhattacharya et al. |
| 6,611,863 B1 | 8/2003  | Banginwar |
| 6,611,864 B2 | 8/2003  | Putzolu et al. |
| 6,973,488 B1 | 12/2005 | Yavatkar et al. |

(Continued)

OTHER PUBLICATIONS

Rocco, J. D., Traceability Visualization in Metamodel Change Impact Detection, GMLD '13: Proceedings of the Second Workshop on Graphical Modeling Language Development, Jul. 2013, pp. 51-62, [retrieved on Apr. 10, 21], Retrieved from the Internet: <URL: http://dl.acm.org/>.*

(Continued)

*Primary Examiner* — Geoffrey R St Leger

(74) *Attorney, Agent, or Firm* — Michael A. Springs; Moore & Van Allen PLLC; Anup Shrinivasan Iyer

(57) ABSTRACT

Systems, computer program products, and methods are described herein for normalizing data dependency effects across an electronic network environment is presented. The present invention is configured to receive a technical business requirement document (BRD) from an external source; implement a data sourcing language (DSL) script on the technical BRD; generate data processing instructions based on at least implementing the DSL on the technical BRD; initiate a data requirement traceability (DRT) engine on the data processing instructions to record the traceability between the data processing instructions and the technical BRD; initiate a data sourcing (DS) engine configured to retrieve, from authorized data sources, input data; initiate a data processing core (DPC) engine configured to implement the data processing instructions on the input data; and generate an output data based on at least implementing the data processing instructions on the input data.

20 Claims, 3 Drawing Sheets

(56) References Cited

U.S. PATENT DOCUMENTS

| | | | |
|---|---|---|---|
| 7,149,738 B2 | 12/2006 | Kumar et al. | |
| 7,170,993 B2 | 1/2007 | Anderson et al. | |
| 7,191,229 B2 | 3/2007 | Edmondson | |
| 7,337,105 B2 | 2/2008 | Sugimoto | |
| 7,698,545 B1 | 4/2010 | Campbell et al. | |
| 7,711,000 B2 | 5/2010 | Hu et al. | |
| 7,735,140 B2 | 6/2010 | Datla et al. | |
| 7,886,035 B2 | 2/2011 | Stark | |
| 7,904,909 B1 | 3/2011 | Reiner et al. | |
| 8,010,952 B2 | 8/2011 | Datla et al. | |
| 8,190,723 B2 | 5/2012 | Datla et al. | |
| 8,196,126 B2 | 6/2012 | Ziegler | |
| 8,203,965 B1 | 6/2012 | Vijendra et al. | |
| 8,229,775 B2 | 7/2012 | Adler et al. | |
| 8,285,874 B2 | 10/2012 | Salmi et al. | |
| 8,327,341 B2 | 12/2012 | Stark | |
| 8,327,414 B2 | 12/2012 | Strassner et al. | |
| 8,914,673 B2 * | 12/2014 | Hachmeister | G06F 11/3672 714/25 |
| 8,949,770 B2 * | 2/2015 | StClair | G06F 11/3684 717/101 |
| 9,519,695 B2 | 12/2016 | Sampathkumaran et al. | |
| 9,576,036 B2 | 2/2017 | Li et al. | |
| 9,576,037 B2 | 2/2017 | Li et al. | |
| 9,659,042 B2 | 5/2017 | Puri et al. | |
| 9,734,188 B1 | 8/2017 | Kashalikar et al. | |
| 9,811,573 B1 | 11/2017 | Xiang et al. | |
| 9,904,960 B2 | 2/2018 | Haber et al. | |
| 9,959,154 B2 | 5/2018 | Haber et al. | |
| 9,984,080 B2 | 5/2018 | Stakutis et al. | |
| 2002/0194045 A1 | 12/2002 | Shay et al. | |
| 2002/0194317 A1 | 12/2002 | Kanada et al. | |
| 2003/0093302 A1 | 5/2003 | Quido et al. | |
| 2003/0225801 A1 | 12/2003 | Devarakonda et al. | |
| 2004/0230681 A1 | 11/2004 | Strassner et al. | |
| 2004/0243692 A1 | 12/2004 | Arnold et al. | |
| 2006/0005228 A1 | 1/2006 | Matsuda | |
| 2006/0069863 A1 | 3/2006 | Palmer et al. | |
| 2006/0184490 A1 | 8/2006 | Heim et al. | |
| 2006/0288409 A1 | 12/2006 | Bartal et al. | |
| 2007/0011331 A1 | 1/2007 | Morimoto et al. | |
| 2007/0038977 A1 * | 2/2007 | Savage | G06F 8/20 717/106 |
| 2007/0094199 A1 | 4/2007 | Deshpande et al. | |
| 2007/0294406 A1 | 12/2007 | Suer et al. | |
| 2008/0263505 A1 * | 10/2008 | StClair | G06F 11/3692 717/101 |
| 2012/0079450 A1 * | 3/2012 | Reech | G06F 16/185 717/104 |
| 2013/0219226 A1 * | 8/2013 | Hachmeister | G06F 11/3672 714/38.1 |

OTHER PUBLICATIONS

Ni, D. C., et al., Process Automation with Enumeration and Traceability Tools, Proceedings of 1994 IEEE International Conference on Industrial Technology—ICIT '94, Dec. 5-9, 1994, pp. 361-365, [retrieved on Apr. 10, 21], Retrieved from the Internet: <URL:http://ieeexplore.ieee.org/>.*

* cited by examiner

SYSTEM FOR NORMALIZING DATA DEPENDENCY EFFECTS ACROSS AN ELECTRONIC NETWORK ENVIRONMENT

FIELD OF THE INVENTION

The present invention embraces a system for normalizing data dependency effects across an electronic network environment.

BACKGROUND

The specific mechanisms for tracking dependencies vary across electronic network environments, making it challenging to compare across languages or package managers. The typical number of dependencies for a representative software package varies widely between ecosystems. There is a need for a system for normalizing data dependency effects across an electronic network environment.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for normalizing data dependency effects across an electronic network environment is presented. The system comprising: at least one non-transitory storage device; and at least one processing device coupled to the at least one non-transitory storage device, wherein the at least one processing device is configured to: electronically receive a technical business requirement document (BRD) from an external source; implement a data sourcing language (DSL) script on the technical BRD; generate one or more data processing instructions based on at least implementing the DSL on the technical BRD; initiate a data requirement traceability (DRT) engine on the one or more data processing instructions, wherein the DRT engine is configured to: ingest the one or more data processing instructions; automatically record traceability between the one or more data processing instructions and the technical BRD; and validate the one or more data processing instructions based on at least recording the traceability between the one or more data processing instructions and the technical BRD; initiate a data sourcing (DS) engine configured to retrieve, from one or more authorized data sources, input data; initiate a data processing core (DPC) engine configured to implement the one or more data processing instructions on the input data; and generate an output data based on at least implementing the one or more data processing instructions on the input data.

In some embodiments, the at least one processing device is further configured to: process the input data using one or more data processing pipelines distributed across the electronic network environment based on at least the one or more data processing instructions, wherein processing further comprises dividing the input data into one or more input sub-streams to be processed using the one or more data processing pipelines in parallel; transforming the one or more input sub-streams to one or more output sub-streams based on the one or more data processing instructions; retrieve the one or more output sub-streams from the one or more data processing pipelines; and generate the output data based on at least combining the one or more output sub-streams from the one or more data processing pipelines.

In some embodiments, the at least one processing device is further configured to: determine one or more destination locations for the one or more output sub-streams, wherein the one or more destination locations comprises at least a data warehouse, one or more applications, and/or one or more other data processing pipelines.

In some embodiments, the at least one processing device is further configured to: allocate one or more versions to each of the one or more input sub-streams and the one or more output sub-streams corresponding to each of the one or more input sub-streams; and initiate a versioning dashboard script configured to generate a graphical representation of the one or more versions of the one or more input sub-streams and the one or more output sub-streams, wherein the graphical representation indicates an initial point of origin of each of the one or more input sub-streams, one or more intermediary points of each of the one or more input sub-streams, and a destination point of each of the one or more input sub-streams.

In some embodiments, the at least one processing device is further configured to initiate a data lineage and provenance (DLP) engine, wherein the DLP engine is configured to: continuously monitor the one or more data processing pipelines for the one or more output sub-streams, wherein monitoring further comprises identifying the one or more input sub-streams associated with the one or more output sub-streams; generate a life cycle for each of the one or more output sub-streams based on at least continuously monitoring the one or more data processing pipelines for the one or more output sub-streams; and store the life cycle for each of the one or more output sub-streams in a scalable database environment.

In some embodiments, generating the life cycle further comprises: identifying an origin point and a destination point for each of the one or more output sub-streams; generating a record trail accounting for each of the one or more output sub-streams based on at least identifying the origin point and the destination point; and identifying the one or more data processing instructions associated with each record in the record trail associated with the one or more output sub-streams.

In some embodiments, the at least one processing device is further configured to: retrieve, from the scalable database environment, the life cycle for each of the one or more output sub-streams; determine a data provenance for each of the one or more output sub-streams, wherein the data provenance further comprises tracking data reflecting one or more data transformations associated with the one or more output sub-streams from the origin point to the destination point; and determine a data lineage for each of the one or more output sub-streams, wherein the data lineage further comprises tracking data reflecting one or more data locations associated with the one or more output sub-streams from the origin point to the destination point.

In some embodiments, the at least one processing device is further configured to initiate a data change discovery and alerting (DCDA) engine to: continuously monitor the one or more output sub-streams for one or more changes to the data lineage and the data provenance; electronically receive an indication of the one or more changes to the data lineage and the data provenance; generate an alert based on at least receiving the indication of the one or more changes to the data lineage and the data provenance; and transmit control signals configured to cause a computing device associated with a user to display the alert indicating the one or more changes.

In some embodiments, the at least one processing device is further configured to: determine one or more data dependencies associated with the one or more output sub-streams within and across the one or more data processing pipelines based on at least continuously monitoring the one or more output sub-streams for one or more changes to the data lineage and the data provenance.

In some embodiments, the at least one processing device is further configured to initiate a data processing scenario (DPS) engine to: continuously monitor the one or more data processing pipelines for the one or more output sub-streams; implement a data stream validation subroutine configured to detect anomalies in the one or more data processing pipelines, wherein the data stream validation subroutine is further configured to: determine a first data quality metric associated with the one or more output sub-streams at a first time instant; determine a second data quality metric associated with the one or more output sub-streams at a second time instant; and detect the anomalies in the one or more data processing pipelines based on at least determining that the first data quality metric does not match the second data quality metric.

In another aspect, a computer implemented method for normalizing data dependency effects across an electronic network environment is presented. The method comprising: electronically receiving a technical business requirement document (BRD) from an external source; implementing a data sourcing language (DSL) script on the technical BRD; generating one or more data processing instructions based on at least implementing the DSL on the technical BRD; initiating a data requirement traceability (DRT) engine on the one or more data processing instructions, wherein the DRT engine is configured to: ingest the one or more data processing instructions; automatically record traceability between the one or more data processing instructions and the technical BRD; and validate the one or more data processing instructions based on at least recording the traceability between the one or more data processing instructions and the technical BRD; initiating a data sourcing (DS) engine configured to retrieve, from one or more authorized data sources, input data; implementing the one or more data processing instructions on the input data; and generating an output data based on at least implementing the one or more data processing instructions on the input data.

In yet another aspect, a computer program product for normalizing data dependency effects across an electronic network environment is presented. The computer program product comprising a non-transitory computer-readable medium comprising code causing a first apparatus to: electronically receive a technical business requirement document (BRD) from an external source; implement a data sourcing language (DSL) script on the technical BRD; generate one or more data processing instructions based on at least implementing the DSL on the technical BRD; initiate a data requirement traceability (DRT) engine on the one or more data processing instructions, wherein the DRT engine is configured to: ingest the one or more data processing instructions; automatically record traceability between the one or more data processing instructions and the technical BRD; and validate the one or more data processing instructions based on at least recording the traceability between the one or more data processing instructions and the technical BRD; initiate a data sourcing (DS) engine configured to retrieve, from one or more authorized data sources, input data; implement the one or more data processing instructions on the input data; and generate an output data based on at least implementing the one or more data processing instructions on the input data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
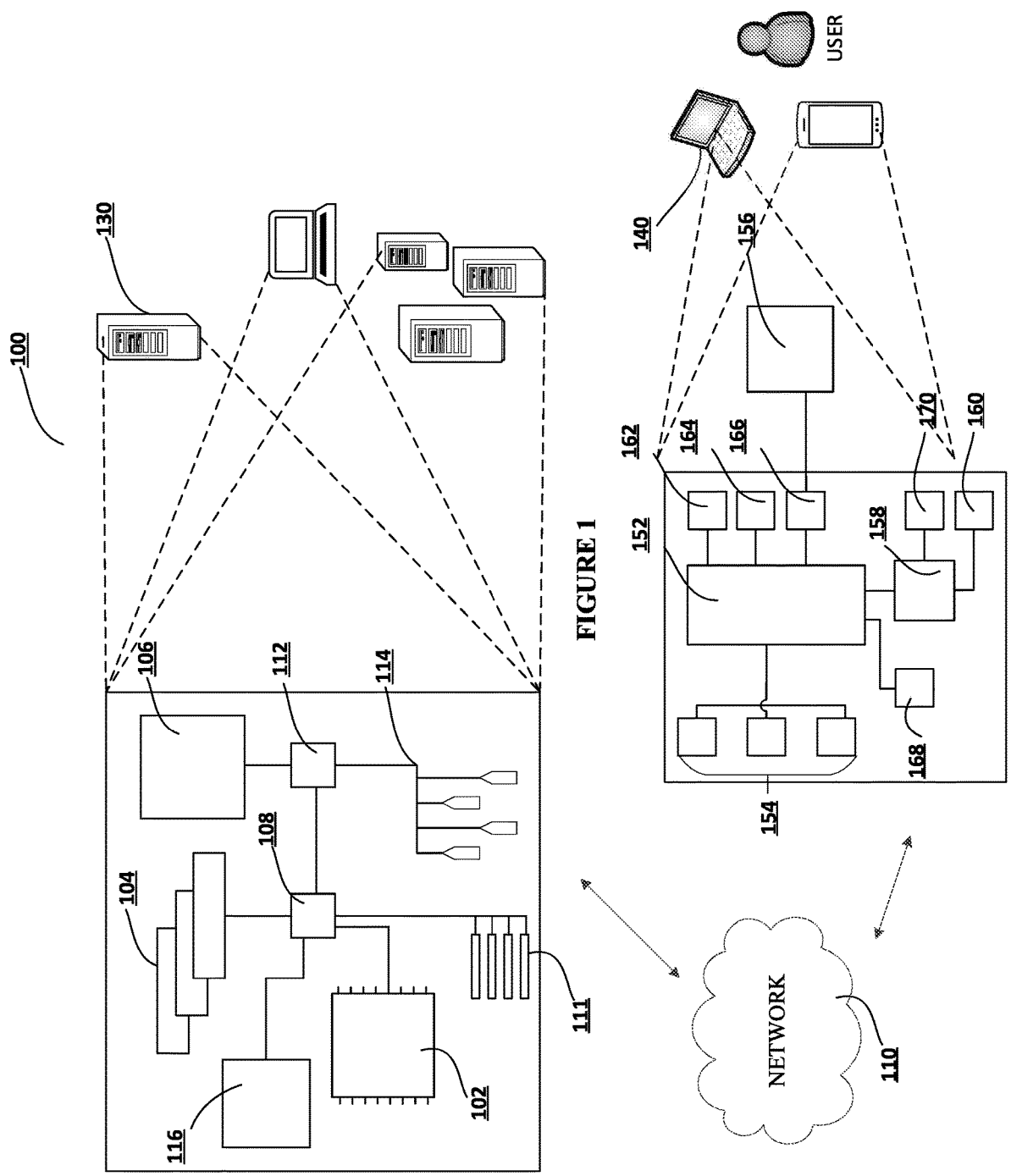
Figure 2:
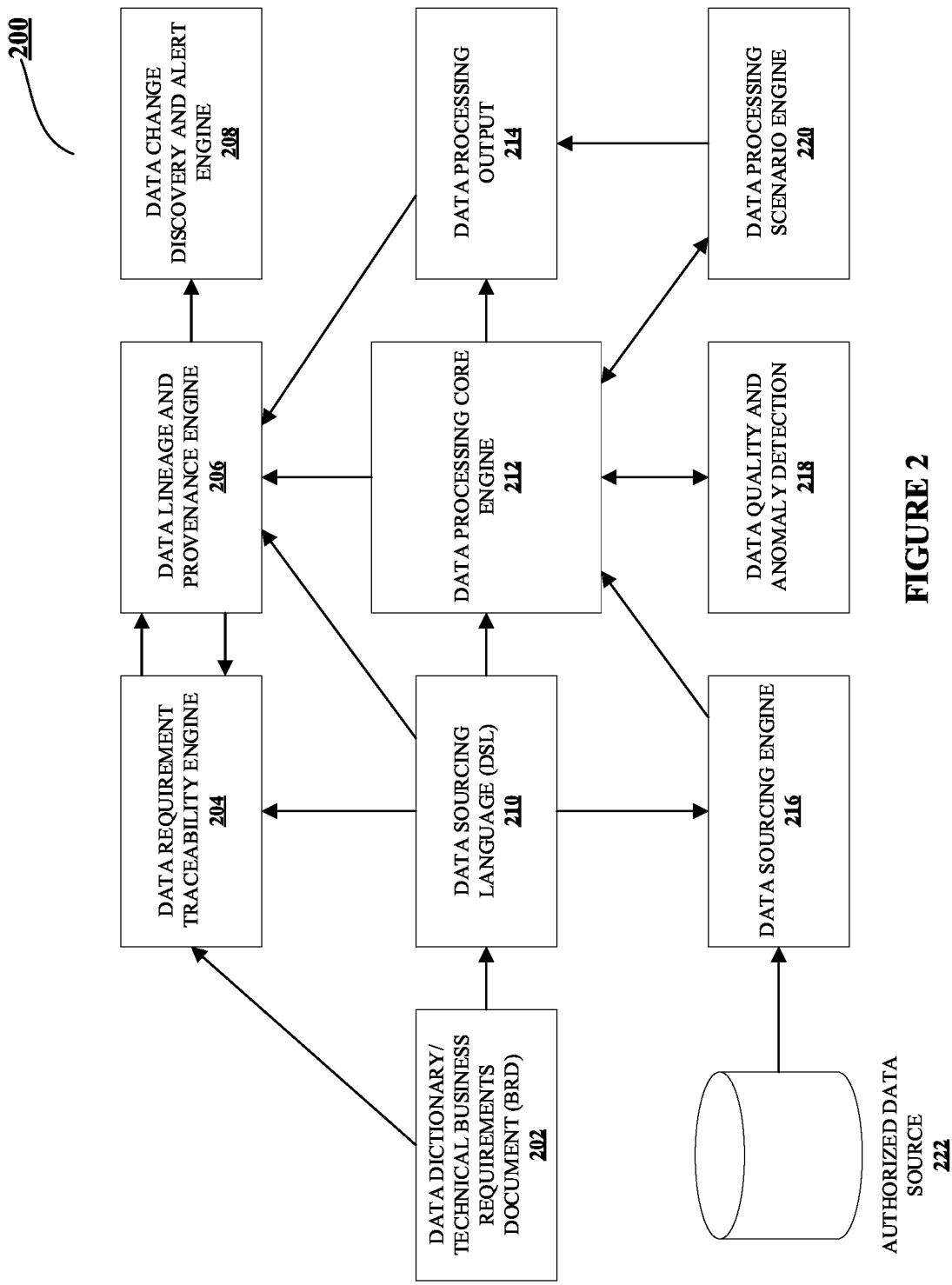
Figure 3:
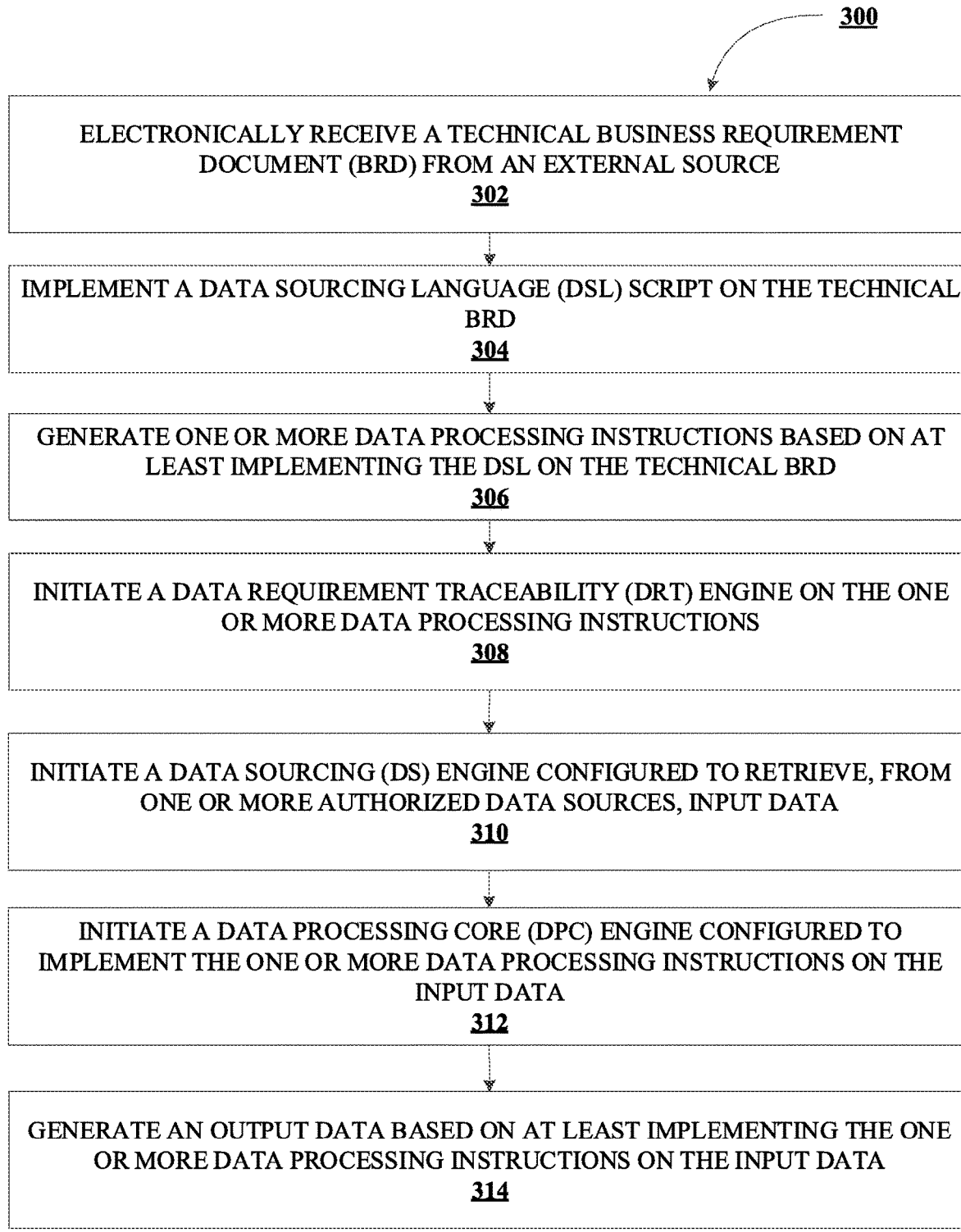

Having thus described embodiments of the invention in general terms, reference will now be made the accompanying drawings, wherein:

FIG. 1 illustrates technical components of a system for normalizing data dependency effects across an electronic network environment, in accordance with an embodiment of the invention;

FIG. 2 illustrates a data processing system architecture for normalizing data dependency effects across an electronic network environment, in accordance with an embodiment of the invention; and FIG. 3 illustrates a process flow for a system for normalizing data dependency effects across an electronic network environment, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As used herein, a "user" may be an individual associated with an entity. In some embodiments, a "user" may be an employee (e.g., a developer, a coder, an architect, an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer.

As used herein, a "user interface" is any device or software that allows a user to input information, such as commands or data, into a device, or that allows the device to output information to the user. For example, the user interface include a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" is any information that can be used to identify of a user. For example, a system may prompt a user to enter authentication information such as a username, a password, a personal identification number (PIN), a passcode, biometric information (e.g., voice authentication, a fingerprint, and/or a retina scan), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

As used herein, to "monitor" is to watch, observe, or check something for a special purpose over a period of time. The "monitoring" may occur periodically over the period of time, or the monitoring may occur continuously over the period of time. In some embodiments, a system may actively monitor a database, wherein the system reaches out to the database and watches, observes, or checks the database for changes, updates, and the like. In other embodiments, a system may passively monitor a database, wherein the database provides information to the system and the system then watches, observes, or checks the provided information.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

FIG. 1 presents an exemplary block diagram of the system environment for normalizing data dependency effects across an electronic network environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device or other non-mobile computing device. The user may be a person who uses the user input system 140 to execute one or more applications stored thereon. The one or more applications may be configured to communicate with the system 130, perform a transaction, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, personal digital assistants, servers, blade servers, mainframes, and other appropriate computers. The user input system 140 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may be a controlled environment to (1) standardize data processing logic implementation in the form of a data sourcing language (DSL) recipe, (2) prevent unauthorized data transformations, (3) promote transparency, and (4) automate data quality validation. In one aspect, the data processing recipe is accountable for implementing the technical business requirements document (BRD) in data sourcing language (DSL). In some embodiments, the system 130 may also include a data output generation for the execution of the data processing recipe in a data processing system runtime environment creating a consistent reproducible structured data output. These data outputs further undergo data quality validations to ensure accuracy and completeness of data. In this regard, each instance of the data processing output may be tested against the technical BRD and report generation to ensure accuracy, completeness, and conformance to regulatory requirements.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application, and allows memory reuse for better utilization of the memory resources when the data sizes are large.

The high-speed interface 1408 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube)

or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

The present invention provides a data processing framework that interprets transformation rules written in a custom designed language and applies them to one or more standard datasets to produce a transformed dataset for business use cases. Accordingly, the present invention defines a common data structure to support the requirements of an individual data processing pipeline and a unified language for describing data pipeline output requirements. The common data structure describes the data processing pipeline, retrieves the base (and auxiliary) datasets, and performs enrichment, filtering, and aggregation on the data. The unified language standardizes and centralizes the semantics, taxonomy and transformation rules, ensures proper versioning of the data output definitions, and uses a core rules-grammar to drive interpretation. In one aspect, the unified language may be used to seamlessly retrieve and combine data from multiple authorized data sources (ADS).

Furthermore, the present invention uses DSL definitions that tie into the enterprise data management standards and makes available all the lineage and required definitional work required for the key business elements. In doing so, the present invention provides transparency and accuracy. In this regard, the DSL "knows" where the data comes from and eliminates the need for ad-hoc sourcing. In addition, the present invention is scalable. Accordingly, it can be run from a single desktop or on a cluster of thousands of machines with no change, enabling system scalable to run hundreds of reports in parallel. In doing so, the present invention provides a common platform enabling skills to be concentrated on development of data processing pipelines instead of infrastructure and system software. In addition, by providing a common language across all reports, the present invention supports a federated model, a central model or a combination of both with transferable skills.

FIG. 2 illustrates a data processing system architecture for normalizing data dependency effects across an electronic network environment 200, in accordance with an embodiment of the invention. As shown in FIG. 2, the data processing system architecture 200 includes a data dictionary/technical business requirements document (BRD) 202. In some embodiments, the technical BRD focuses on the business perspective as it holds the details of the business solution emphasizing the needs and expectations of the customer. Accordingly, the BRD indicates all the deliverables and the inputs and outputs associated with each process function. In some other embodiments, the technical BRD may be a structural idea of a template that holds fields in relation to other fields by applying specific instructions. In one aspect, report template, field and instructions are extracted and formally memorialized into technical BRD. In some embodiments, the technical BRD may include a data dictionary. The data dictionary may be a building block first order structure to capture applicable regulations, business requirements, and data requirements along with current state technical definitions.

Also part of the data processing system architecture 200 is the data sourcing engine 216. In some embodiments, the data sourcing engine 216 may be configured to source data from an authorized data source 222. In one aspect, an authorized data source 222 may be a data management term for an information storage system (commonly implemented on a computer system running a database management system) that is the authoritative data source for a given data element or piece of information.

Also part of the data processing system architecture 200 is the data sourcing language (DSL) 210. In some embodiments, the DSL is a proprietary language used to memorialize data requirements in form of data processing instructions. In this regard, DSL provides a controlled environment for designing and developing data processing pipelines that promote transparency, visibility, and accuracy of data inputs. DSL is a simple but powerful language constructs with built-in controls to design well-controlled and well-managed data processing pipelines. DSL has easy to use annotations to support requirement traceability, data quality validation, data lineage and provenance capture among others. In some embodiments, the data processing system architecture may include a integrated development environment (IDE) for authoring DSL components with outlining, code completion, and validation. Furthermore, the DSL has the ability to define custom data processing functions to support enhanced data processing needs. By providing a standardized way of developing transparent and well-controlled data processing pipelines, the DSL reduces costs of data tooling, data processing development and data support, while promoting a transparent approach to data development.

Also part of the data processing system architecture 200 is the data processing core (DPC) engine 212. In some embodiments, the DPC engine may be configured to interpret the data sourcing language constructs defined for a data processing pipeline and execute data processing instructions in a standalone environment or cluster encompassing thousands of servers with no additional coding. The DPC engine is typically configured to be a storage agnostic and language agnostic. In some embodiments, the DPC engine may be configured to interpret and execute data sourcing language processing instructions and data processing functions to support enhanced data processing needs. In addition, the DPC engine may be configured to support stand-alone and cluster run-time environments for maximum scalability. In some embodiments, the DPC engine may be configured to have the ability to store results from execution of each data processing instruction in a pipeline, with a built-in support for versioning of datasets and data sourcing language recipes.

Also part of the data processing system architecture 200 is the data requirement traceability (DRT) engine 204. In some embodiments, the DRT engine may be configured to solve to fundamental issue of data requirement traceability in implemented code and validation to ensure that all data requirements are implemented in data sourcing language code per requirements. In one aspect, the DRT engine may be configured to validate the technical BRD against data processing instructions in the data sourcing language. In this regard, the DRT engine may be configured to record traceability between data processing instructions and requirements. In some other embodiments, the DRT engine may be configured to validate the requirements implementation by ensuring that data processing instructions defined in data sourcing language adhere to the data requirements, and validate data processing output against data requirements to ensure conformance to requirements. In doing so, the DRT engine ensures improvement in the accuracy of data processing output by ensuring that all requirements are implemented per specification and output conforms to requirements.

Also part of the data processing system architecture 200 is the data lineage and provenance (DLP) engine 206. In some embodiments, the DLP engine may be configured to understand the instructions defined in the data sourcing language, link requirements to data lineage, record data lineage and provenance for each data processing instruction, and validate the data provenance output against requirements. In one aspect, the DLP engine may include a dashboard routine to generate a graphical representation of data element relationships and dependencies within and across data processing pipelines. In one aspect, the graphical representation may be a directed acyclic graph (DAG) capable of displaying relationship between variables (often referred to as nodes in the context of graphs). In some embodiments, the DLP engine may be configured to scan and build data lineage through interpretation of data sourcing language recipe. In some other embodiments, the DLP engine may be configured to build data provenance through automated linkage of output from data processing instructions. In addition to building data lineage and data provenance, the DLP engine may be configured to implement smart visualization tools to view the lineage and provenance within and across data processing pipelines.

Also part of the data processing system architecture 200 is the data quality and anomaly detection (DQAD) engine 218. In some embodiments, the DQAD engine may be configured to interpret and execute data quality validation instructions defined using data sourcing language data quality annotations. In some embodiments, the DQAD engine may be configured to validate the quality of data and/or detect anomalies in the previous execution of the same data. In this regard, the DQAD engine may include built-in assertions capable of asserting that the change after an operation is within some boundary (i.e., percentage increase/decrease). In one aspect, any breaches of the assertions may tend to cause the execution to immediately halt. In some other embodiments, the DQAD engine may be configured to automate validations—a check performed on a single row of data using an arbitrary expression. In one aspect, the validation may further be scoped to only check if certain conditions are met. Any breaches may be recorded and there can be a bound on the number of allowable breaches, which, if surpasses, will cause the execution to immediately halt. In addition to inline checks, the DQAD engine may be configured to send the inputs and outputs of the execution to an external data quality platform to perform any additional data quality rule checks.

Also part of the data processing system architecture 200 is the data change discovery and alerting (DCDA) engine 208. In some embodiments, the DCDA engine may be configured to monitor changes in the data lineage and determine data dependencies (upstream and downstream impact of data) at each node of the data lineage. In this regard, the DCDA engine may be configured to compare data lineage and provenance captured by the DLP engine and detect changes during subsequent runs. In some embodiments, the DCDA engine may be configured to generate an alert when a change in the data lineage and/or provenance is discovered.

Also part of the data processing system architecture 200 is the data processing scenario (DPS) engine 220. In some embodiments, the DPS engine may be configured to store temporal history of execution output from every data processing pipeline (and all steps within) and accurate reproduction of data processing pipeline results for as-of specific date and time.

Also part of the data processing system architecture 200 is the data processing output 214. In some embodiments, the data processing output may be configured to record data provenance for final data processing output.

In some embodiments, a user may be allowed to access data at each step of the data transformation. In this regard, the system may be configured to determine whether the user has the adequate authorization to access the data. In one aspect, the system may be configured to transmit control signals configured to cause the computing device of the user to display a user interface requesting one or more authentication credentials from the user. In response, the system may be configured to receive one or more authentication credentials from the user for authorization to access the data. In some embodiments, the system may be configured to determine whether the user has the adequate authorization to access the data by verifying the authentication credentials against an authentication database. In response to verifying the authentication credentials, the system may be configured to allow the user to access the data. In some embodiments, at least some portion of the data may contain sensitive information. In such scenarios, despite having proper authorization, the system may be configured to mask specific portions of the sensitive data from the user.

FIG. 3 illustrates a process flow for a system for normalizing data dependency effects across an electronic network environment 300, in accordance with an embodiment of the invention. As shown in block 302, the process flow includes electronically receiving a technical business requirement document (BRD) from an external source.

Next, as shown in block 304, the process flow includes implementing a data sourcing language (DSL) script on the technical BRD.

Next, as shown in block 306, the process flow includes generating one or more data processing instructions based on at least implementing the DSL on the technical BRD.

Next, as shown in block 308, the process flow includes initiating a data requirement traceability (DRT) engine on the one or more data processing instructions. In one aspect, the DRT engine may be configured to ingest the one or more data processing instructions, automatically record traceability between the one or more data processing instructions and the technical BRD, and validate the one or more data processing instructions based on at least recording the traceability between the one or more data processing instructions and the technical BRD.

Next, as shown in block 310, the process flow includes initiating a data sourcing (DS) engine configured to retrieve, from one or more authorized data sources, input data. In some embodiments, the system may be configured to process the input data using one or more data processing pipelines distributed across the electronic network environment based on at least the one or more data processing instructions. In one aspect, the system may be configured to divide the input data into one or more input sub-streams to be processed using the one or more data processing pipelines in parallel. In response, the system may be configured to transform the one or more input sub-streams to one or more output sub-streams based on the one or more data processing instructions. Once transformed, the system may be configured to then retrieve the one or more output sub-streams from the one or more data processing pipelines. Having retrieved the one or more output sub-streams, the system may be configured to generate the output data based on at least combining the one or more output sub-streams from the one or more data processing pipelines.

In some embodiments, the system may be configured to determine one or more destination locations for the one or more output sub-streams, wherein the one or more destination locations comprises at least a data warehouse, one or more applications, and/or one or more other data processing pipelines.

Next, as shown in block 312, the process flow includes initiating a data processing core (DPC) engine configured to implement the one or more data processing instructions on the input data.

Next, as shown in block 314, the process flow includes generating an output data based on at least implementing the one or more data processing instructions on the input data.

In some embodiments, the system may be configured to initiate a data processing scenario (DPS) engine to allocate one or more versions to each of the one or more input sub-streams and the one or more output sub-streams corresponding to each of the one or more input sub-streams. In one aspect, the DPS engine may be configured to initiate a versioning dashboard script configured to generate a graphical representation of the one or more versions of the one or more input sub-streams and the one or more output sub-streams, wherein the graphical representation indicates an initial point of origin of each of the one or more input sub-streams, one or more intermediary points of each of the one or more input sub-streams, and a destination point of each of the one or more input sub-streams.

In some embodiments, the system may be configured to initiate a data lineage and provenance (DLP) engine to continuously monitor the one or more data processing pipelines for the one or more output sub-streams, wherein monitoring further comprises identifying the one or more input sub-streams associated with the one or more output sub-streams. In response, the DLP engine may be configured to generate a life cycle for each of the one or more output sub-streams based on at least continuously monitoring the one or more data processing pipelines for the one or more output sub-streams. In one aspect, generating the life cycle further includes identifying an origin point and a destination point for each of the one or more output sub-streams. In response, the system may be configured to generate a record trail accounting for each of the one or more output sub-streams based on at least identifying the origin point and the destination point. In response, the system may be configured to identify the one or more data processing instructions associated with each record in the record trail associated with the one or more output sub-streams. In response to generating the life cycle, the DLP engine may be configured to store the life cycle for each of the one or more output sub-streams in a scalable database environment.

In some embodiments, the system may be configured to retrieve, from the scalable database environment, the life cycle for each of the one or more output sub-streams. In response, the system may be configured to determine a data provenance for each of the one or more output sub-streams. In one aspect, the data provenance further comprises tracking data reflecting one or more data transformations associated with the one or more output sub-streams from the origin point to the destination point. In addition, the system may be configured to determine a data lineage for each of the one or more output sub-streams. In one aspect, the data lineage further comprises tracking data reflecting one or more data locations associated with the one or more output sub-streams from the origin point to the destination point.

In some embodiments, the system may be configured to initiates a data change discovery and alerting engine (DCDA) to continuously monitor the one or more output sub-streams for one or more changes to the data lineage and the data provenance. In response, the DCDA engine may be configured to electronically receive an indication of the one or more changes to the data lineage and the data provenance. In one aspect, the DCDA engine may be further configured to generate an alert based on at least receiving the indication of the one or more changes to the data lineage and the data provenance. In response, the DCDA engine may be configured to transmit control signals configured to cause a computing device associated with a user to display the alert indicating the one or more changes.

In some embodiments, the system may be configured to determine one or more data dependencies associated with the one or more output sub-streams within and across the one or more data processing pipelines based on at least continuously monitoring the one or more output sub-streams for one or more changes to the data lineage and the data provenance.

In some embodiments, the system may be configured to initiate a data quality and anomaly detection (DQAD) engine to continuously monitor the one or more data processing pipelines for the one or more output sub-streams. In response, the DQAD engine may be further configured to implement a data stream validation subroutine configured to detect anomalies in the one or more data processing pipelines. In one aspect, the data stream validation subroutine may be configured to determine a first data quality metric associated with the one or more output sub-streams at a first time instant. In addition, the data stream validation subroutine may be configured to determine a second data quality metric associated with the one or more output sub-streams at a second time instant. In response to determining the first data quality metric and the second data quality metric, the data stream validation subroutine may be configured to detect the anomalies in the one or more data processing pipelines based on at least determining that the first data quality metric does not match the second data quality metric.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for normalizing data dependency effects across an electronic network environment, the system comprising:
    at least one non-transitory storage device; and
    at least one processing device coupled to the at least one non-transitory storage device, wherein the at least one processing device is configured to:
        electronically receive a technical business requirement document (BRD) from an external source;
        implement a data sourcing language (DSL) script on the technical BRD;
        generate one or more data processing instructions based on at least implementing the DSL on the technical BRD;
        initiate a data requirement traceability (DRT) engine on the one or more data processing instructions, wherein the DRT engine is configured to:
            ingest the one or more data processing instructions;
            automatically record traceability between the one or more data processing instructions and the technical BRD; and
            validate the one or more data processing instructions based on at least recording the traceability between the one or more data processing instructions and the technical BRD;
        initiate a data sourcing (DS) engine configured to retrieve, from one or more authorized data sources, input data;
        initiate a data processing core (DPC) engine configured to implement the one or more data processing instructions on the input data;
        divide the input data into one or more input sub-streams;
        generate an output data based on at least implementing the one or more data processing instructions on the input data;
        transform the one or more input sub-streams to one or more output sub-streams based on at least the one or more data processing instructions; and
        initiate a data processing scenario (DPS) engine to:
            allocate one or more versions to each of the one or more input sub-streams and the one or more output sub-streams corresponding to each of the one or more input sub-streams; and
            initiate a versioning dashboard script configured to generate a graphical representation of the one or more versions of the one or more input sub-streams and the one or more output sub-streams, wherein the graphical representation indicates an initial point of origin of each of the one or more input sub-streams, one or more intermediary points of each of the one or more input sub-streams, and a destination point of each of the one or more input sub-streams.

2. The system of claim 1, wherein the at least one processing device is further configured to:
    process the input data using one or more data processing pipelines distributed across the electronic network environment based on at least the one or more data processing instructions, wherein processing further comprises dividing the input data into the one or more input sub-streams to be processed using the one or more data processing pipelines in parallel;
    retrieve the one or more output sub-streams from the one or more data processing pipelines; and
    generate the output data based on at least combining the one or more output sub-streams from the one or more data processing pipelines.

3. The system of claim 2, wherein the at least one processing device is further configured to:
    determine one or more destination locations for the one or more output sub-streams, wherein the one or more destination locations comprises at least a data warehouse, one or more applications, and/or one or more other data processing pipelines.

4. The system of claim 1, wherein the at least one processing device is further configured to initiate a data lineage and provenance (DLP) engine, wherein the DLP engine is configured to:
    continuously monitor one or more data processing pipelines for the one or more output sub-streams, wherein monitoring further comprises identifying the one or more input sub-streams associated with the one or more output sub-streams;
    generate a life cycle for each of the one or more output sub-streams based on at least continuously monitoring the one or more data processing pipelines for the one or more output sub-streams; and
    store the life cycle for each of the one or more output sub-streams in a scalable database environment.

5. The system of claim 4, wherein generating the life cycle further comprises:
    identifying an origin point and a destination point for each of the one or more output sub-streams;
    generating a record trail accounting for each of the one or more output sub-streams based on at least identifying the origin point and the destination point; and
    identifying the one or more data processing instructions associated with each record in the record trail associated with the one or more output sub-streams.

6. The system of claim 5, wherein the at least one processing device is further configured to:
    retrieve, from the scalable database environment, the life cycle for each of the one or more output sub-streams;
    determine a data provenance for each of the one or more output sub-streams, wherein the data provenance further comprises tracking data reflecting one or more data transformations associated with the one or more output sub-streams from the origin point to the destination point; and
    determine a data lineage for each of the one or more output sub-streams, wherein the data lineage further comprises tracking data reflecting one or more data locations associated with the one or more output sub-streams from the origin point to the destination point.

7. The system of claim 4, wherein the at least one processing device is further configured to initiate a data change discovery and alerting (DCDA) engine to:
    continuously monitor the one or more output sub-streams for one or more changes to the data lineage and the data provenance;
    electronically receive an indication of the one or more changes to the data lineage and the data provenance;
    generate an alert based on at least receiving the indication of the one or more changes to the data lineage and the data provenance; and
    transmit control signals configured to cause a computing device associated with a user to display the alert indicating the one or more changes.

8. The system of claim 7, wherein the at least one processing device is further configured to:
    determine one or more data dependencies associated with the one or more output sub-streams within and across the one or more data processing pipelines based on at least continuously monitoring the one or more output sub-streams for one or more changes to the data lineage and the data provenance.

9. The system of claim 4, wherein the at least one processing device is further configured to initiate a data processing scenario (DPS) engine to:
    continuously monitor the one or more data processing pipelines for the one or more output sub-streams;
    implement a data stream validation subroutine configured to detect anomalies in the one or more data processing pipelines, wherein the data stream validation subroutine is further configured to:
        determine a first data quality metric associated with the one or more output sub-streams at a first time instant;
        determine a second data quality metric associated with the one or more output sub-streams at a second time instant; and
        detect the anomalies in the one or more data processing pipelines based on at least determining that the first data quality metric does not match the second data quality metric.

10. A computer implemented method for normalizing data dependency effects across an electronic network environment, the method comprising:
    electronically receiving a technical business requirement document (BRD) from an external source;
    implementing a data sourcing language (DSL) script on the technical BRD;
    generating one or more data processing instructions based on at least implementing the DSL on the technical BRD;
    initiating a data requirement traceability (DRT) engine on the one or more data processing instructions, wherein the DRT engine is configured to:
        ingest the one or more data processing instructions;
        automatically record traceability between the one or more data processing instructions and the technical BRD; and
        validate the one or more data processing instructions based on at least recording the traceability between the one or more data processing instructions and the technical BRD;
    initiating a data sourcing (DS) engine configured to retrieve, from one or more authorized data sources, input data;
    initiating a data processing core (DPC) engine configured to implement the one or more data processing instructions on the input data;
    dividing the input data into one or more input sub-streams;
    generating an output data based on at least implementing the one or more data processing instructions on the input data;
    transforming the one or more input sub-streams to one or more output sub-streams based on at least the one or more data processing instructions; and
    initiating a data processing scenario (DPS) engine to:
        allocate one or more versions to each of the one or more input sub-streams and the one or more output sub-streams corresponding to each of the one or more input sub-streams; and
        initiate a versioning dashboard script configured to generate a graphical representation of the one or more versions of the one or more input sub-streams and the one or more output sub-streams, wherein the graphical representation indicates an initial point of origin of each of the one or more input sub-streams, one or more intermediary points of each of the one or more input sub-streams, and a destination point of each of the one or more input sub-streams.

11. The method of claim 10, wherein the method further comprises:
    processing the input data using one or more data processing pipelines distributed across the electronic network environment based on at least the one or more data processing instructions, wherein processing further comprises dividing the input data into the one or more input sub-streams to be processed using the one or more data processing pipelines in parallel;
    retrieving the one or more output sub-streams from the one or more data processing pipelines; and
    generating the output data based on at least combining the one or more output sub-streams from the one or more data processing pipelines.

12. The method of claim 11, wherein the method further comprises:
    determining one or more destination locations for the one or more output sub-streams, wherein the one or more destination locations comprises at least a data warehouse, one or more applications, and/or one or more other data processing pipelines.

13. The method of claim 10, wherein the method further comprises initiating a data lineage and provenance (DLP) engine, wherein the DLP engine is configured to:
    continuously monitor one or more data processing pipelines for the one or more output sub-streams, wherein monitoring further comprises identifying the one or more input sub-streams associated with the one or more output sub-streams;
    generate a life cycle for each of the one or more output sub-streams based on at least continuously monitoring the one or more data processing pipelines for the one or more output sub-streams; and
    store the life cycle for each of the one or more output sub-streams in a scalable database environment.

14. The method of claim 13, wherein generating the life cycle further comprises:
    identifying an origin point and a destination point for each of the one or more output sub-streams;
    generating a record trail accounting for each of the one or more output sub-streams based on at least identifying the origin point and the destination point; and
    identifying the one or more data processing instructions associated with each record in the record trail associated with the one or more output sub-streams.

15. The method of claim 14, wherein the method further comprises:
    retrieving, from the scalable database environment, the life cycle for each of the one or more output sub-streams;
    determining a data provenance for each of the one or more output sub-streams, wherein the data provenance further comprises tracking data reflecting one or more data transformations associated with the one or more output sub-streams from the origin point to the destination point; and
    determining a data lineage for each of the one or more output sub-streams, wherein the data lineage further comprises tracking data reflecting one or more data locations associated with the one or more output sub-streams from the origin point to the destination point.

16. The method of claim 13, wherein the method further comprises a data change discovery and alerting (DCDA) engine to:
   continuously monitor the one or more output sub-streams for one or more changes to the data lineage and the data provenance;
   electronically receive an indication of the one or more changes to the data lineage and the data provenance;
   generate an alert based on at least receiving the indication of the one or more changes to the data lineage and the data provenance; and
   transmit control signals configured to cause a computing device associated with a user to display the alert indicating the one or more changes.

17. The method of claim 16, wherein the method further comprises:
   determining one or more data dependencies associated with the one or more output sub-streams within and across the one or more data processing pipelines based on at least continuously monitoring the one or more output sub-streams for one or more changes to the data lineage and the data provenance.

18. A computer program product for normalizing data dependency effects across an electronic network environment, the computer program product comprising a non-transitory computer-readable medium comprising code causing a first apparatus to:
   electronically receive a technical business requirement document (BRD) from an external source;
   implement a data sourcing language (DSL) script on the technical BRD;
   generate one or more data processing instructions based on at least implementing the DSL on the technical BRD;
   initiate a data requirement traceability (DRT) engine on the one or more data processing instructions, wherein the DRT engine is configured to:
      ingest the one or more data processing instructions;
      automatically record traceability between the one or more data processing instructions and the technical BRD; and
      validate the one or more data processing instructions based on at least recording the traceability between the one or more data processing instructions and the technical BRD;
   initiate a data sourcing (DS) engine configured to retrieve, from one or more authorized data sources, input data;
   initiate a data processing core (DPC) engine configured to implement the one or more data processing instructions on the input data;
   divide the input data into one or more input sub-streams;
   generate an output data based on at least implementing the one or more data processing instructions on the input data;
   transform the one or more input sub-streams to one or more output sub-streams based on at least the one or more data processing instructions; and
   initiate a data processing scenario (DPS) engine to:
      allocate one or more versions to each of the one or more input sub-streams and the one or more output sub-streams corresponding to each of the one or more input sub-streams; and
      initiate a versioning dashboard script configured to generate a graphical representation of the one or more versions of the one or more input sub-streams and the one or more output sub-streams, wherein the graphical representation indicates an initial point of origin of each of the one or more input sub-streams, one or more intermediary points of each of the one or more input sub-streams, and a destination point of each of the one or more input sub-streams.

19. The computer program product of claim 18, wherein the first apparatus is further configured to:
   determine one or more destination locations for the one or more output sub-streams, wherein the one or more destination locations comprises at least a data warehouse, one or more applications, and/or one or more other data processing pipelines.

20. The computer program product of claim 18, wherein the first apparatus is further configured to initiate a data lineage and provenance (DLP) engine, wherein the DLP engine is configured to:
   continuously monitor one or more data processing pipelines for the one or more output sub-streams, wherein monitoring further comprises identifying the one or more input sub-streams associated with the one or more output sub-streams;
   generate a life cycle for each of the one or more output sub-streams based on at least continuously monitoring the one or more data processing pipelines for the one or more output sub-streams; and
   store the life cycle for each of the one or more output sub-streams in a scalable database environment.

\* \* \* \* \*